(12) United States Patent
Singh et al.

(10) Patent No.: US 10,705,815 B2
(45) Date of Patent: Jul. 7, 2020

(54) SPLIT INSTALLATION OF A SOFTWARE PRODUCT

(71) Applicant: SAP SE, Walldorf (DE)

(72) Inventors: Prakash Singh, Bangalore (IN); Sai Hari Prasad Pabbathi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/968,900

(22) Filed: Dec. 15, 2015

(65) Prior Publication Data

US 2017/0168793 A1    Jun. 15, 2017

(51) Int. Cl.
    *G06F 8/61*    (2018.01)
    *G06F 8/656*   (2018.01)

(52) U.S. Cl.
    CPC .............. *G06F 8/61* (2013.01); *G06F 8/656* (2018.02)

(58) Field of Classification Search
    CPC .................................................. G06F 8/60–66
    See application file for complete search history.

(56) References Cited

U.S. PATENT DOCUMENTS

| | | | | |
|---|---|---|---|---|
| 6,473,771 B1 * | 10/2002 | Zimniewicz | ............. | G06F 8/61 |
| 6,725,452 B1 * | 4/2004 | Te'eni | ............. | G06F 8/61 |
| | | | | 717/168 |
| 9,081,747 B1 * | 7/2015 | Tabieros | ............. | G06F 9/4411 |
| 2002/0038375 A1 * | 3/2002 | Yamada | ............. | H04L 67/06 |
| | | | | 709/231 |
| 2003/0192031 A1 * | 10/2003 | Srinivasan | ............. | G06F 8/61 |
| | | | | 717/120 |
| 2006/0218528 A1 * | 9/2006 | Lerner | ............. | G06F 8/60 |
| | | | | 717/120 |
| 2007/0101197 A1 * | 5/2007 | Moore | ............. | G06F 8/61 |
| | | | | 714/38.1 |
| 2011/0271273 A1 * | 11/2011 | Dumais | ............. | G06F 8/61 |
| | | | | 717/175 |
| 2014/0282469 A1 * | 9/2014 | Johnson | ............. | G06F 8/65 |
| | | | | 717/170 |

OTHER PUBLICATIONS

IBM, "Upgrade Timeline", Published Jun. 10, 2014, https://www.ibm.com/support/knowledgecenter/POWER7/p7hbm/upgrade_timeline.htm, Retrieved Mar. 13, 2020 (Year: 2014).*

Flexera, "Managing the Enterprise Software Lifecycle", Published Jun. 5, 2012, https://www.flexera.com/blog/application-readiness/2012/06/managing-the-enterprise-software-lifecycle/, Retrieved Mar. 13, 2020 (Year: 2012).*

* cited by examiner

*Primary Examiner* — Geoffrey R St. Leger
*Assistant Examiner* — Joanne G Macasiano
(74) *Attorney, Agent, or Firm* — Fish & Richardson P.C.

(57) ABSTRACT

Various embodiments of systems and methods to provide split installation of a software product are described herein. In one aspect, a request for split installation of a software product is received. A pre-installation document corresponding to installation of the software product in a first phase of the split installation is generated and stored when at least one other applications continue to run. The pre-installation document includes installation information of the software product. Further, one or more deployment units are cached for installation of the software product based on the installation information. The software product is installed by installing the one or more deployment units based on the pre-installation document in a second phase of the split installation.

12 Claims, 10 Drawing Sheets

| FILE | EDIT | SEARCH |

DOCUMENT.INI 310 ☒

```
68  # THE ACCEPTABLE VALUE OF WEBAPPSERVERTYPE: TOMCAT/WACS/MANUAL/NONE
69  WEBAPPSERVERTYPE=TOMCAT
70
71  ### CHOOSE TO INTEGRATE SOLUTION MANAGER DIAGNOSTICS (SMD) AGENT: INTEGRATE OR NOINTEGRATE
72  CHOOSESMDINTEGRATION=NOINTEGRATE
73
74  #CHOOSE TO INTEGRATED INTROSCOPE: INTEGRATE OR NOINTEGRATE
75  CHOOSEINTROSCOPEINTEGRATION=NOINTEGRATE
76                                                    ┌─ 360
77  #LIST THE FEATURES INSTALLED BY DEFAULT ─┘
    FEATURES=JAVAWEBAPPS1,TOMCAT60,WEBTIER,CMS,FRS,PLATFORMSERVERS.INTEGRATEDDB,SQLANYWHERE,PLATFORMSERVERS.EVENTSERVER,
    PLATFORMSERVERS.SYSTEMLANDSCAPESUPPLIER,ADAPTIVEPROCESSINGSERVER,ADAPTIVEJOBSERVER,PLATFORM.RESTWEBSERVICE,PLATFORM.
    ACTIONFRAMEWORK.BACKEND,SUBVERSION,CONNECTIONPROCSERVICE,CONNECTIONSERVICES.DATAFEDERATORQUERYSERVICE,DATAFEDERATO
    RSERVICES,MULTIDIMENSIONALANALYSISSERVICES,BEXWEBAPPLICATIONSSERVICE,ADVANCEDANALYSISSERVICE,CRYSTALREPORTSPROCSERVIC
    ES,CRYSTALREPORTSCHEDULINGSERVICES,CRYSTALREPORT2011PROCSERVICES,CRYSTALREPORT2011SCHEDULINGSERVICES,CRYSTALREPORTSS
    ERVERS,WEBIPROCSERVER,WEBISCHEDULINGSERVICES,WEBISERVERS,XCELSIUSSERVERS,MOBILESERVERS,MOBILEADDON,MOBILESERVICES,BWP
    UBLISHERSERVER,INTEGRATIONSERVERS,MULTITENANCYMANAGER,UPGRADEMANAGER,ADMINISTRATORTOOLS,BOE64BITNETSDK,DEVELOPERTOOL
    S,DATAACCESS.DATAFEDERATOR,DATAACCESS.HPNEOVIEW,DATAACCESS.HPVERTICA,DATAACCESS.MYSQL,DATAACCESS.GENERICJDBC,DATAACCE
    SS.GENERICOLEDB,DATAACCESS.OPTIONALDATADIRECTODBC,DATAACCESS.MAXDB,DATAACCESS.SALESFORCE,DATAACCESS.NETEZZA,DATAACCES
    S.MICROSOFT_ANALYTICALSERVICES,DATAACCESS.MICROSOFTEXCHANGE,DATAACCESS.MICROSOFTOUTLOOK,DATAACCESS.MICROSOFT_SQLSERV
    ER,DATAACCESS.MICROSOFT_ACCESS,DATAACCESS.INGRES,DATAACCESS.HADOOPHIVE,DATAACCESS.TERADATA,DATAACCESS.IBMDB2,DATAACC
    ESS.INFORMIX,DATAACCESS.PROGRESSOPENEDGE,DATAACCESS.ORACLE,DATAACCESS.SYBASE,DATAACCESS.JAVABEAN,DATAACCESS.SAPBW,DAT
    AACCESS.SAPBW64,DATAACCESS.SAP,DATAACCESS.SAPHANA,DATAACCESS.PERSONALFILES,DATAACCESS.OPENCONNECT
    IVITY,DATAACCESS.HSQLDB,DATAACCESS.DERBY,DATAACCESS.UNIVERSE,DATAACCESS.MYCUBE,DATAACCESS.XML,DATAAC
    CESS.ADO.NET,DATAACCESS.COMDATA,DATAACCESS.DATASET,DATAACCESS.SYMANTECACT,DATAACCESS.BDE,DATAACCESS.CDO,DATAACCESS.FIE
    LDDEFINITIONS,DATAACCESS.FILESYSTEM,DATAACCESS.NTEVENTLOG,DATAACCESS.WEBACTIVITYLOG,DATAACCESS.BTRIEVE,DATAACCESS.DBASE,
    DATAACCESS.UWSC,DATAACCESS.SAPERP,DATAACCESS.ORACLEEBS,SAMPLES
```

FIG. 3C

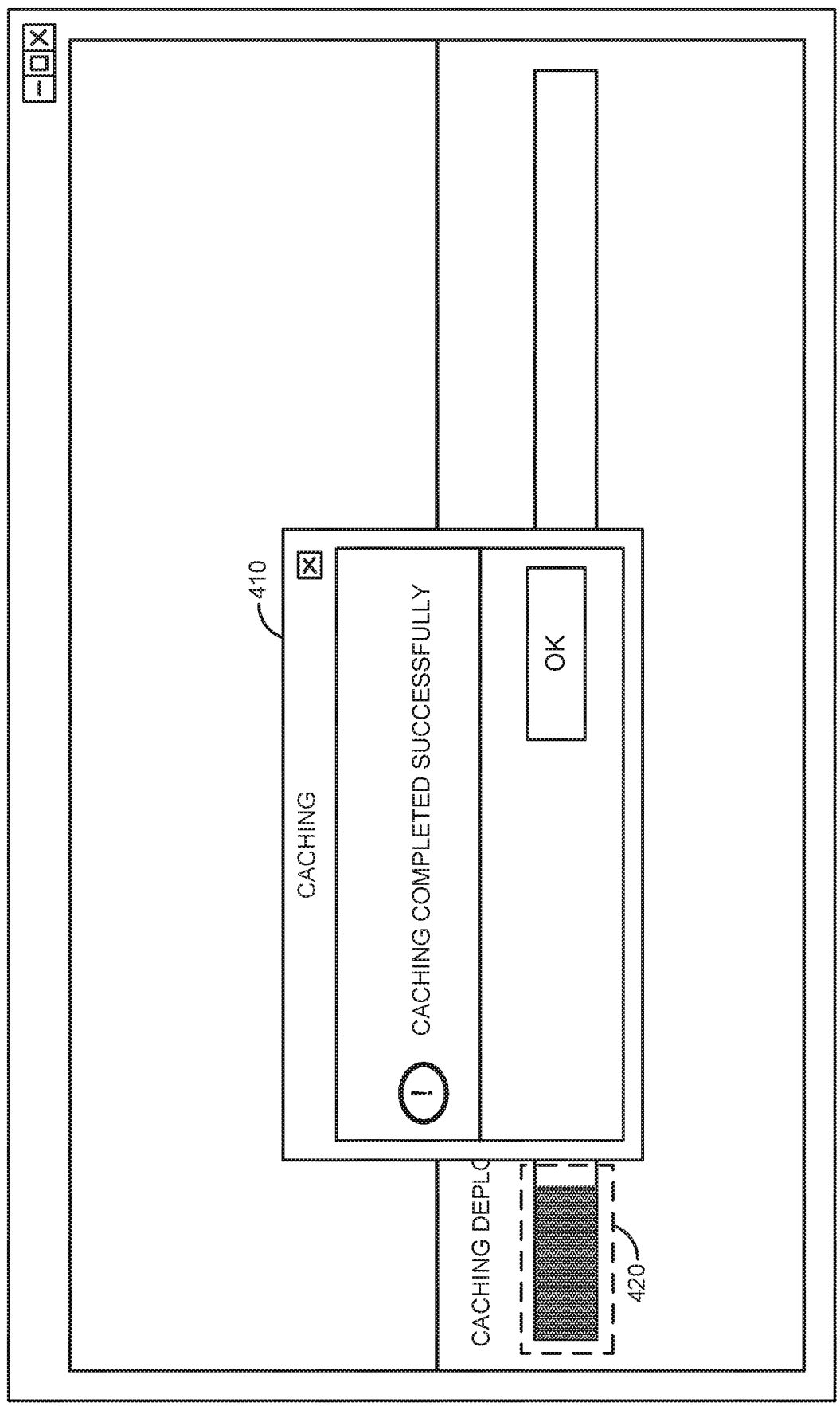

SPLIT INSTALLATION OF A SOFTWARE PRODUCT

FIELD

Embodiments generally relate to computer systems and more particularly to methods and systems to provide split installation of a software product.

BACKGROUND

Software products can be upgraded to provide additional features, fix problems or bugs in earlier releases, improve security, and/or for other reasons. As new features are replacing the old at a faster pace, new versions of a software product may need to be installed frequently to get the new features. Further, installing the new versions of the software products may have an impact on users' performance as users' devices may be unavailable during installation process. For example, when installing the new version of the software product, a user may have to quit the currently running applications on the device. Further, the time for installation process may depend upon a network bandwidth, and may result in down time of the device.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIGS. 3A to 3C show an exemplary pre-installation document, according to an embodiment.

FIG. 4 shows an exemplary graphical user interface (GUI) indicating completion of a first phase of a split installation, according to an embodiment.

DETAILED DESCRIPTION

Embodiments of techniques to provide split installation of a software product are described herein. In the below description, numerous specific details are set forth to provide a thorough understanding of embodiments. One skilled in the relevant art will recognize, however that the embodiments can be practiced without one or more of the specific details or with other methods, components, techniques, etc. In other instance, well-known operations or structures are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. Upon completion of the first step, a second step is executed. Such a situation will be specifically pointed out when not clear from the context. A particular step may be omitted. A particular step is required only when its omission would materially impact another step.

In this document, various computer-implemented methods, processes and procedures are described. It is to be understood that the various actions (determining, identifying, notifying, storing, retrieving, etc.) are performed by a hardware device (e.g., computing system), even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted.

Figure 1:
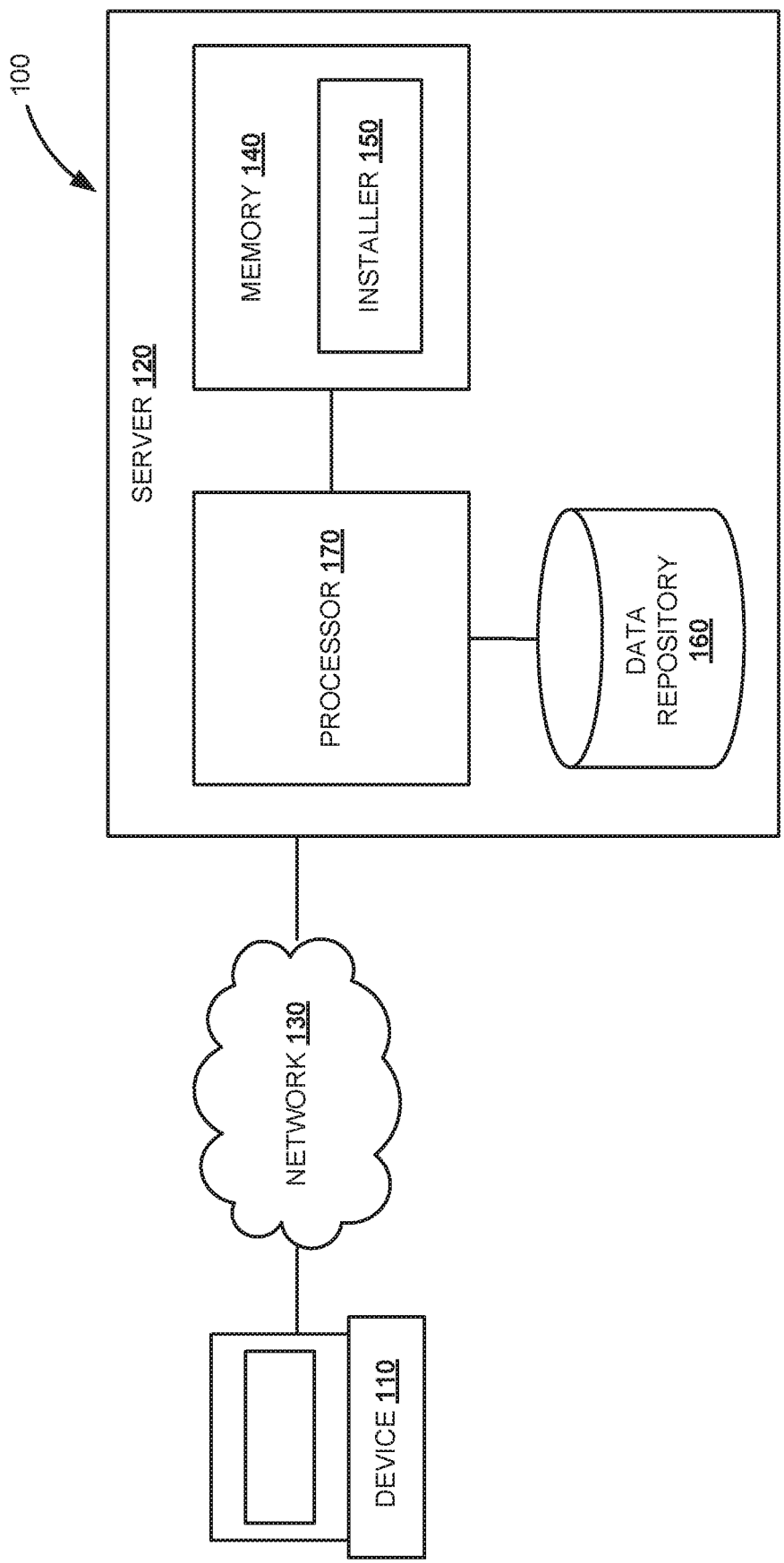
FIG. 1 is a block diagram illustrating an example of a system in which an environment described herein may be implemented, according to an embodiment.

FIG. 1 is a block diagram illustrating an example of system 100 in which an environment described herein may be implemented, according to an embodiment. The system 100 includes one or more front-end components (e.g., device 110) and a back-end component (e.g., server 120). Network 130 allows the front-end component (e.g., the device 110) and the back-end component (e.g., the server 120) to communicate and exchange data. The network 130 may include a high-speed data link to connect the device 110 to the server 120, for instance. The connection may be wired or wireless. The device 110 may be a computing device, such as but not limited to a desktop computer, a laptop computer, a handheld computer, a tablet computer, a personal digital assistant (PDA), a cellular telephone, a network appliance, a camera, a smart phone, or an appropriate combination of any two or more of these devices or other data processing devices, that are capable of requesting the server 120 for installing a software product.

The server 120 may be any type of computing system that is capable of receiving, processing and storing data, and of communicating with the device 110. As shown in FIG. 1, the server 120 includes one or more processors (referred as "processor 170") and memory 140 that stores computer programs that are executable by the processor 170. Further, the processor 170 or central processing unit (CPU) may be in electronic communication with a non-transitory computer-readable storage medium through a high speed memory bus, for instance. In one exemplary embodiment, the computer-readable storage medium stores program code. Further, the code may be configured to reference data stored in a database, e.g., on the non-transitory computer-readable storage medium.

The processor 170 executes the instructions stored in the memory 140, which may require accessing relevant data stored in data repository 160. In one embodiment, the memory 140 includes installer 150, which can be modules of computer program instructions to install applications or software products requested by users at the device 110. Further, the installer 150 may be, depending upon the implementation, part of a module of the server 120 or the device 110. For example, the installer 150 can be implemented on a computing system such as a desktop computer, personal computer, tablet, cell phone or other mobile device, to install the requested software product.

A software product may include different program applications, where an application may be a set of computer programs designed to permit the device 110 to perform a group of coordinated functions, tasks, or activities. For example, SAP Business Objects® is a software product to visualize and mine data. Further, SAP Business Objects includes multiple products or applications such as SAP BusinessObjectsServer®, Explorer, Crystal Sever®, MiniBIP®, BusinessObjectsClient®, Xcelsius®, CrystalReportsJava®, CrystalServerClient®, LiveOffice®, IPoint®, WebIWeb® and report application server (RAS®), for instance. The applications may be arranged in such a way that they could be installed with a same software program. The downtime during installation depends on factors such as, but not limited to, number of patches installed in the device, latency of the network if installation is performed from a remote location, etc.

In one embodiment, when a software product is to be installed, an option is provided for performing split installation. The installation of the software product can be installation of a new software product or a new version of an installed software product. Split installation includes two phases of installation. In the first phase of installation, the device or server on which the software product to be installed is prepared for the installation by generating a pre-installation document. The pre-installation document includes information for installation such as, but not limited to, data for authentication associated with the device, different folders or location or path where the software product to be installed, and deployment units to be copied. The deployment units may be copied or cached based on information in the pre-installation document. For example, not all portions are required when the installation of patch is performed.

Further, during the first phase of the split installation, at least one other applications on the device continues to run. During the second phase of the split installation, the new version of the software product is installed using the pre-installation document. The deployment units copied during the first phase are installed during the second phase. Thereby, the downtime of the device during installation is reduced because preparing the device and caching of the deployment units are completed in the first phase of the split installation.

Figure 2:
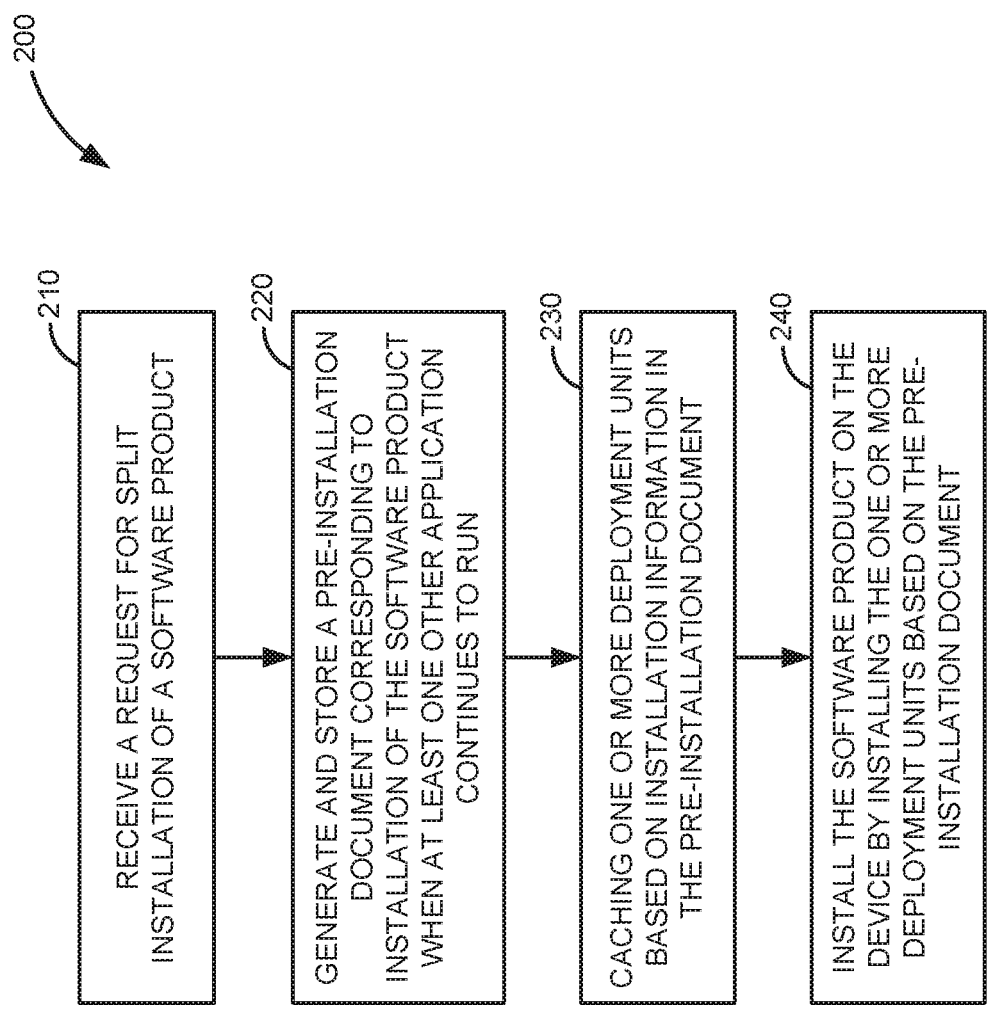
FIG. 2 is a flow diagram illustrating an example process to provide split installation of a software product, according to an embodiment.

FIG. 2 is a flow diagram illustrating example process 200 to provide split installation of a software product, according to an embodiment. The software product may include multiple applications. One example of such a software product is SAP Business Objects. The SAP Business Objects includes, but is not limited to SAP BusinessObjectsServer, Explorer, CrystalSever, MiniBIP, BusinessObjectsClient, Xcelsius, CrystalReportsJava, CrystalServerClient, LiveOffice, Point, WebIWeb and RAS. The process 200 described in process blocks 210 to 240 below is not limited to embodiments that solve disadvantages or that operate in environments such as those described. Further, the described process 200 for split installation can be extended for scenarios where the software product is to be updated or a new software product is to be installed on a device or a server.

At 210, a request for split installation of the software product on the device is received. In one exemplary embodiment, when the software product has to be installed, an option is provided for performing split installation. A user may choose to proceed with split installation or an existing standard installation. When the user chooses split installation, the process 200 described in process blocks 220 and 240 is executed. The split installation includes two phases of installation. The first phase of the split installation, also referred to as caching phase, may include preparation of the device for the installation. The second phase, also referred to as resumed installation phase, may include installation of the software product based on information gathered during the first phase.

At 220, a pre-installation document corresponding to the installation of the software product is generated and stored during the first phase of the split installation. In one embodiment, the pre-installation document is generated and stored in parallel to at least one other application independently running on the device. In one exemplary embodiment, the at least one other application can be an application corresponding to the software product being installed or another application independent of the software product being installed. Thereby, the device may not be down during the first phase of the split installation.

In one exemplary embodiment, the pre-installation document includes data for authentication associated with the device and installation information of the software product. The data for authentication may include sensitive information associated with the device such as, but not limited to identity information of the device, passwords, install location and port numbers, for instance. In one exemplary embodiment, sensitive information is encrypted and stored in the pre-installation document. The installation information may include information about deployment units necessary for installing the software product based on parameters such as current version of the software product on the device, existing features of the software product, and the like.

Further, during the first phase, at least one other application on the device continues to run, one or more deployment units may be cached for installation of the software product based on the installation information in the pre-installation document, at 230. For example, the deployment units are cached at locations specified in the pre-installation document. A deployment unit may include a build (e.g., an executable collection of components), documents (e.g., user support material and release notes) and installation artifacts (e.g., Extensible Markup Language (XML) files, Microsoft® Installer (MSI) files). In one embodiment, the device is not down during generation of the pre-installation document and caching of the deployment units.

At 240, the software product is installed on the device, by installing the one or more deployment units based on the pre-installation document during the second phase of the split installation. In one exemplary embodiment, the second phase of the split installation can be halted and resumed upon a time interval. The second phase of split installation includes retrieving the pre-installation document, checking for errors in the pre-installation document, rectifying the errors, when such errors are determined, and installing the software product on the device. Determining an error may include a check whether the first phase of the split installation is successfully completed. For example, when the deployment units are not copied properly, the deployment units are copied again before resuming the second phase of the split installation.

Figure 3A:
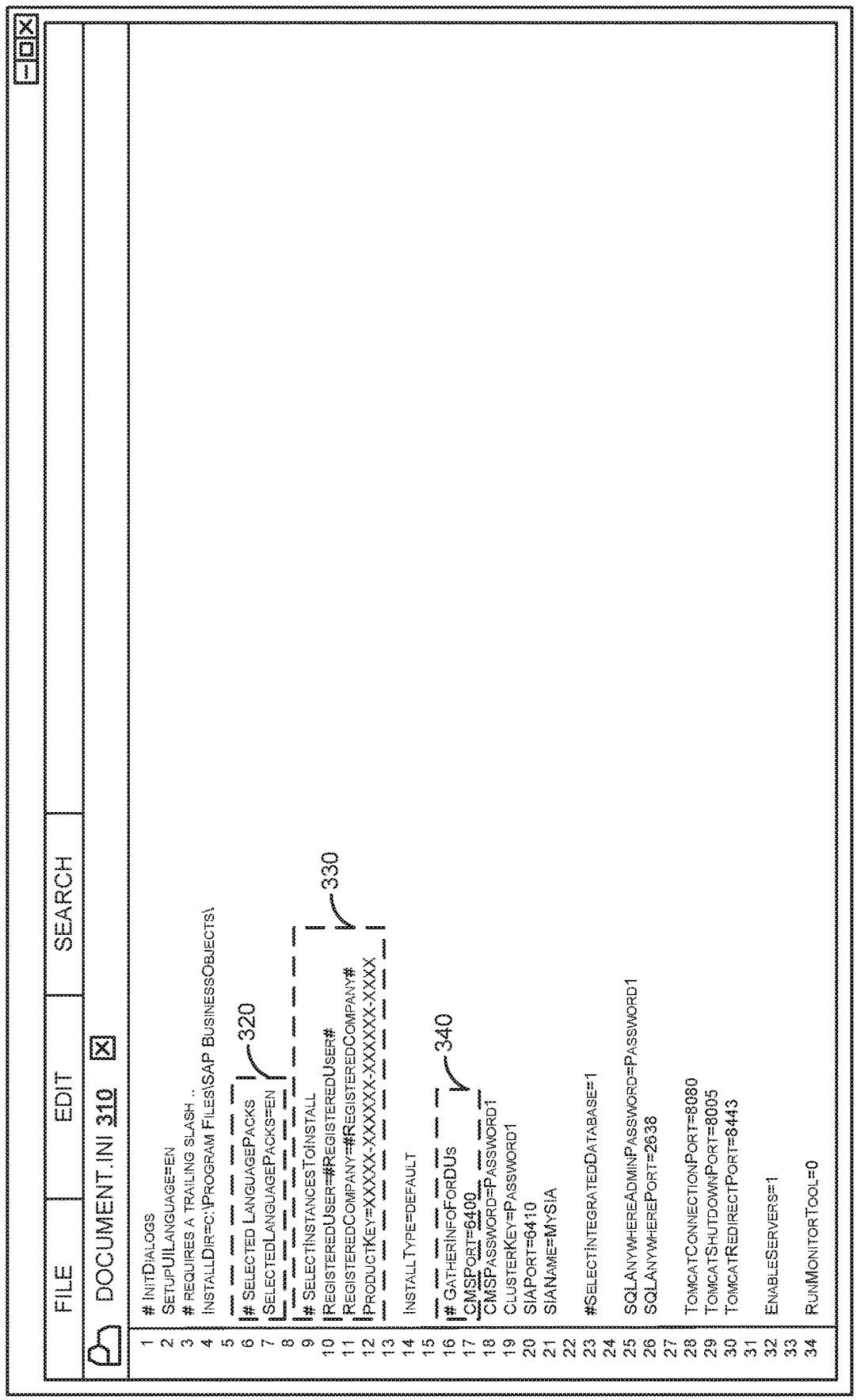
Figure 3B:
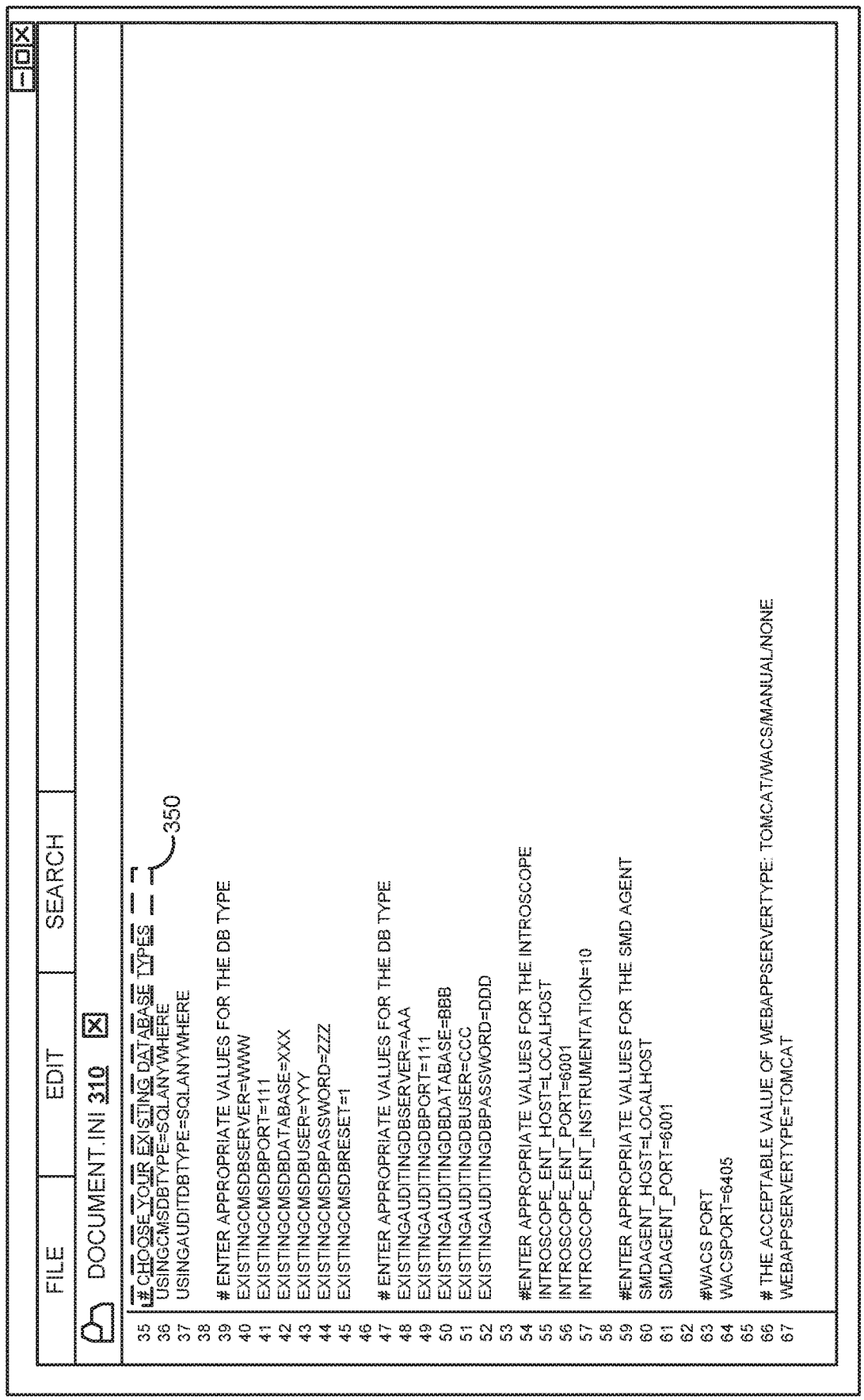

FIGS. 3A to 3C show exemplary pre-installation document 310, according to an embodiment. The pre-installation document 310 is generated during first phase of a split installation. The pre-installation document may include data for authentication associated with device and installation information of a software product corresponding to already installed applications on the device. For example, the pre-installation document 310 includes a preferred language in which the software product is to be installed (e.g., 320), sensitive information such as instances to be installed such as product key (e.g., 330), port and database information for downloading deployment units (e.g., 340) as shown in FIG. 3A. The pre-installation document 310 includes information of database types 350) as shown in FIG. 313. Further, the pre-installation document 310 includes features to be installed (e.g., 360) as shown in FIG. 3C.

FIG. 4 shows an exemplary graphical user interface (GUI) indicating completion of a first phase of a split installation, according to an embodiment. The GUI includes a pop-up message (e.g., 410) indicating "caching completed successfully." Further, it is observed (e.g., 420) that a part of the installation is completed when deployment units for installation are downloaded or cached.

Figure 5:
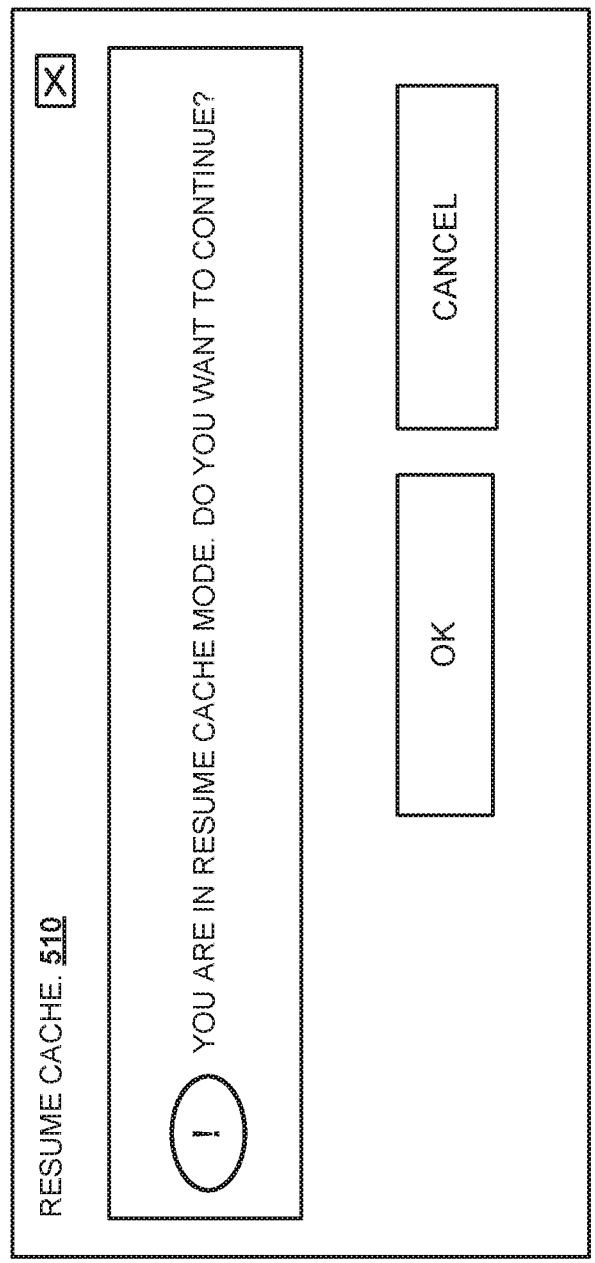
FIG. 5 shows an exemplary pop-up message indicating an option to initiate a second phase of a split installation, according to an embodiment.

FIG. 5 shows an exemplary pop-up message indicating an option to initiate a second phase of a split installation, according to an embodiment. Upon storing the pre-installation document and copying deployment units, process of the split installation is halted or paused. Further, a user can initiate the second phase of the split installation at a desired time. Since a part of the installation is completed (e.g., completion of first phase, cache process), the user can resume the installation whenever the user desires to install the software product. The software product will resume installation from a point where the installation was paused (i.e., end of first phase of split installation). To initiate the second phase, the pop-up message indicating "resume cache" (e.g., 510) is displayed.

Figure 6:
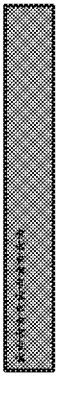
FIG. 6 shows an exemplary graphical user interface (GUI) for providing sensitive information, according to an embodiment.

FIG. 6 shows an exemplary graphical user interface (GUI) for providing sensitive information, according to an embodiment. When a pre-installation document is generated during a first phase of split installation, sensitive information (e.g., passwords, place holders) is stored in encrypted format. The sensitive information is not written into the pre-installation document instead the encrypted sensitive information is stored in the pre-installation document. Thereby, the user needs to replace the encrypted sensitive information while resuming e split installation (i.e., second phase). During second phase of the split installation, installation process is resumed by updating the pre-installation document with the sensitive information at the respective place holders. The GUI provides an option to update the sensitive information (e.g., 610 and 620) as shown in FIG. 6.

Figure 7:
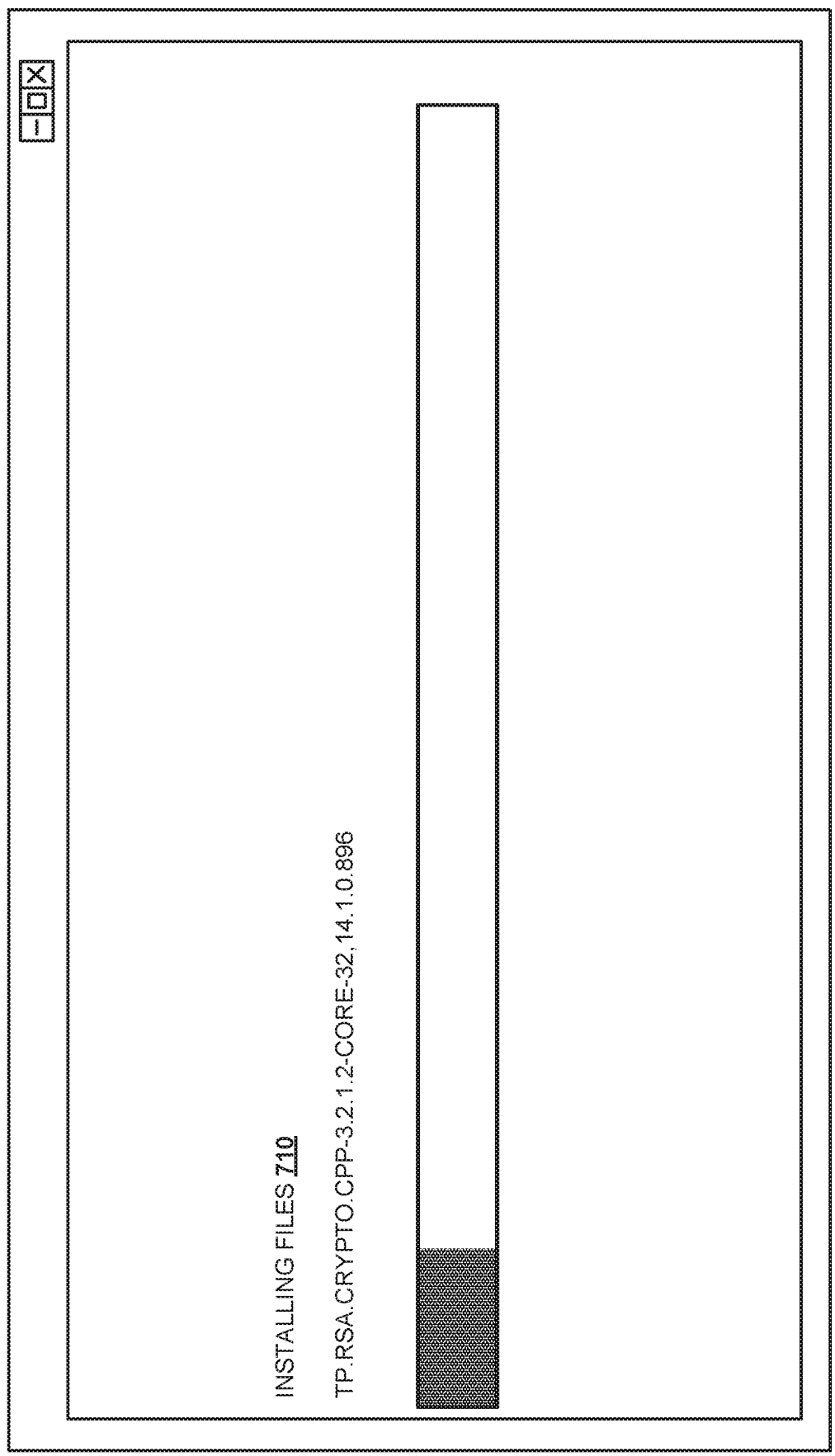
FIG. 7 shows an exemplary graphical user interface (GUI) illustrating installation of a software product during second phase of a split installation, according to an embodiment.

FIG. 7 shows an exemplary graphical user interface (GUI) illustrating installation of a software product during second phase of a split installation, according to an embodiment. Upon completion of storing a pre-installation document and caching deployment units during first phase of the split installation, a user can resume the split installation at a later point of time. To resume the split-installation or to initiate the second phase of the split installation, the following command can be entered/selected, for instance:

C:\New POC\Xcelsius>setup.exe-resume_after_cache document.ini

Upon entering the above command (e.g., in a command prompt of a Windows® based system), the user is prompted with a confirmation dialogue, to seek the confirmation whether the user would like to resume the split installation. When the user consents, the user is provided a graphical user interface to update the sensitive information as described in FIG. 6. In one exemplary embodiment, a check is made to determine whether caching of the deployment units is successfully completed. Further, when there is any error in caching, the error is corrected and then the software product is successfully installed. Since the deployment units necessary for installing the software product are cached during the first phase of the split installation, the second phase of the split installation is independent of a network. The exemplary GUI of installation (e.g., installing files 710) of the software product is depicted in FIG. 7.

Therefore, the split installation reduces the downtime of a device during installation as the device is prepared and relevant deployment units are copied on the device without affecting deployed applications in the first phase of the split installation. Further, the second phase of split installation is efficient in resuming much faster than standard installation to make it faster while resuming (e.g., memoization).

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computing system that is remotely located from a second computing system containing an interface level (e.g., a graphical user interface). These first and second computing systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computing system which causes the computing system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
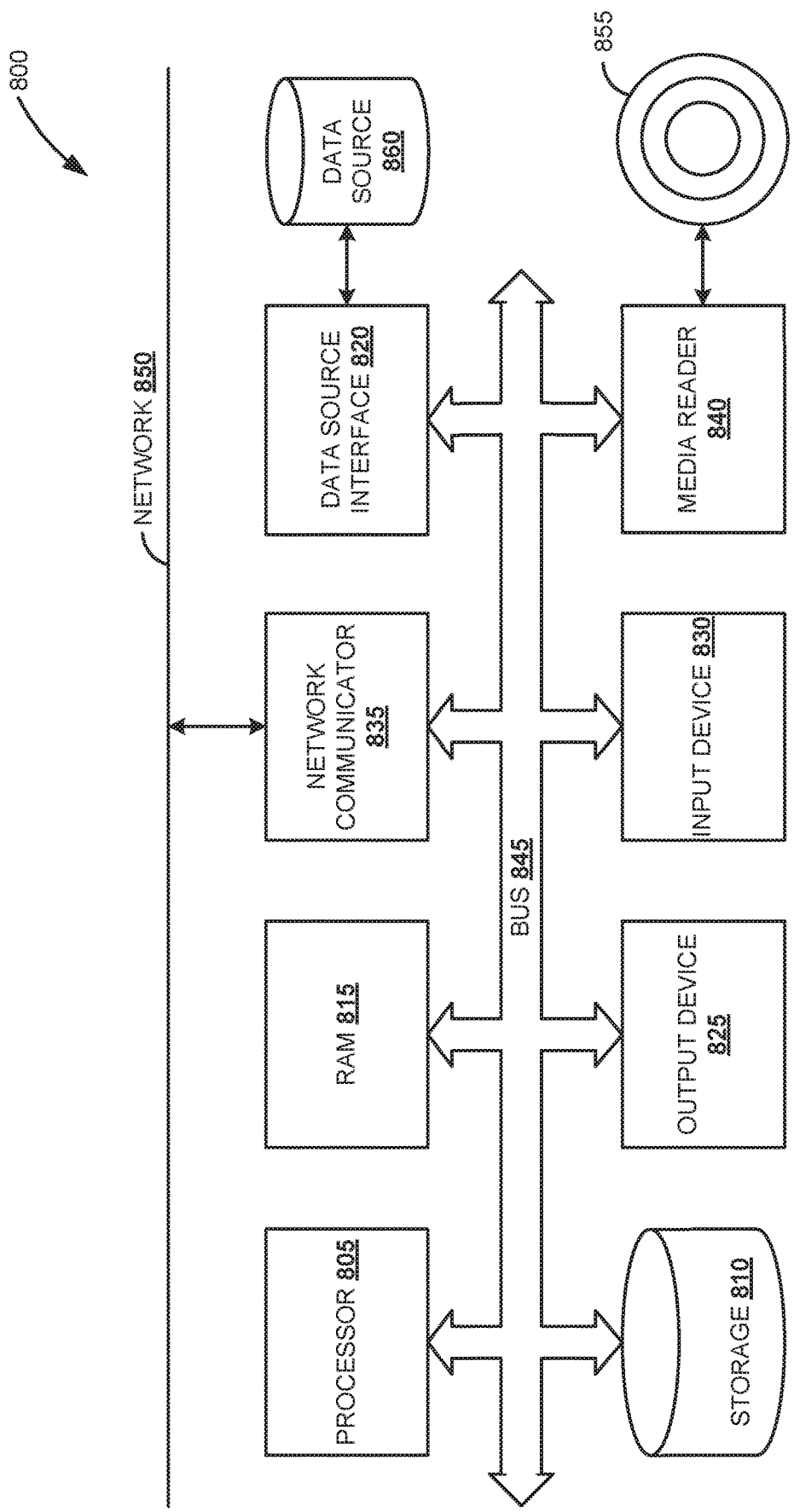
FIG. 8 is a block diagram of an example computing system, according to an embodiment.

FIG. 8 is a block diagram of example computing system 800, according to an embodiment. The computing system 800 includes a processor 805 that executes software instructions or code stored on a computer readable storage medium 855 to perform the above-illustrated methods. The processor 805 can include a plurality of cores. The computing system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computing system 800 further includes an output device 825 (e.g., a display) to provide at least some of the results of the execution as output including, but not limited to, visual information to users and an input device 830 to provide a user or another device with means for entering data and/or otherwise interact with the computing system 800. One or more of these output devices 825 and input devices 830 could be joined by one or more additional peripherals to further expand the capabilities of the computing system 800. A network communicator 835 may be provided to connect the computing system 800 to a network 850 and in turn to other devices connected to the network 850 including other clients, servers, data stores, and interfaces, for instance. The modules of the computing system 800 are interconnected via a bus 845. Computing system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer, cause the computer to:
   receive a request for an installation of a new version of an installed software product, the installed software product including at least one application that is running when the installation is performed, the request for the installation of the new version of the installed software product including a product installation option value comprising one of a split installation option for performing a split installation of the product in multiple phases or a standard installation option for performing a standard installation of the product, wherein the product installation option value controls whether the split installation of the product or the standard installation of the product is performed;
   determine whether the product installation option value is the split installation option;
   in response to determining that the product installation option value is the split installation option:
      in a first phase of the split installation, perform operations including the split installation of the new version of the installed software product, comprising:
         while the at least one application is running, generating and storing a pre-installation document associated with the split installation of the new version of the installed software product, wherein the pre-installation document comprises installation information including one or more deployment units and data for authenticating the computer, wherein the data for authenticating the computer is selected from at least one of an identity information of the computer, a password, a location of installation on the computer, and one or more port numbers, and wherein sensitive information is encrypted in the pre-installation document; and based on the installation information from the pre-installation document, caching, while the at least one application is running, at least one deployment unit from the one or more deployment units corresponding to the split installation of the new version of the installed software product;

receive an indication of successful completion of the first phase of the split installation; and in response to receiving the indication of the successful completion of the first phase of the split installation:

provide a resume option to either initiate a second phase of the split installation or cancel the split installation;

receive, in response to providing the resume option, an indication to initiate the second phase of the split installation;

determine that the pre-installation document includes encrypted sensitive information that needs to be replaced;

provide a user interface for requesting sensitive information for authenticating the computer to replace the encrypted sensitive information;

receive, through the user interface, sensitive information to replace the encrypted sensitive information; and replace, in the pre-installation document, the encrypted sensitive information with the received sensitive information to create an updated pre-installation document; and install the at least one deployment unit from the one or more deployment units corresponding to the new version of the installed software product in the second phase of the split installation, based on the updated pre-installation document; and in response to determining that the product installation option value is the standard installation option, performing the standard installation of the product.

2. The non-transitory computer-readable medium of claim 1, wherein the data for authentication is encrypted in the pre-installation document.

3. The non-transitory computer-readable medium of claim 1, wherein the one or more deployment units comprise a build, documents and installation artifacts.

4. The non-transitory computer-readable medium of claim 1, wherein the second phase of the split installation, comprises:

retrieve the pre-installation document;
determine an error in the pre-installation document;
rectify the error when the error is determined; and
install the at least one deployment unit from the one or more deployment units corresponding to the new version of the installed software product on the computer.

5. A computer implemented method to provide a split installation of a new version of an installed software product, comprising:

receiving a request for an installation of a new version of an installed software product, the installed software product including at least one application that is running when the installation is performed, the request for the installation of the new version of the installed software product including a product installation option value comprising one of a split installation option for performing a split installation of the product in multiple phases or a standard installation option for performing a standard installation of the product, wherein the product installation option value controls whether the split installation of the product or the standard installation of the product is performed;

determining whether the product installation option value is the split installation option;

in response to determining that the product installation option value is the split installation option:

in a first phase of the split installation, perform operations including the split installation of the new version of the installed software product, comprising:

while the at least one application is running, generating and storing a pre-installation document associated with the split installation of the new version of the installed software product, wherein the pre-installation document comprises installation information including one or more deployment units and data for authenticating the computer, wherein the data for authenticating the computer is selected from at least one of an identity information of the computer, a password, a location of installation on the computer, and one or more port numbers, and wherein sensitive information is encrypted in the pre-installation document; and based on the installation information from the pre-installation document, caching, while the at least one application is running, at least one deployment unit from the one or more deployment units corresponding to the split installation of the new version of the installed software product;

receive an indication of successful completion of the first phase of the split installation; and in response to receiving the indication of the successful completion of the first phase of the split installation:

provide a resume option to either initiate a second phase of the split installation or cancel the split installation;

receive, in response to providing the resume option, an indication to initiate the second phase of the split installation;

determine that the pre-installation document includes encrypted sensitive information that needs to be replaced;

provide a user interface for requesting sensitive information for authenticating the computer to replace the encrypted sensitive information;

receive, through the user interface, sensitive information to replace the encrypted sensitive information; and replace, in the pre-installation document, the encrypted sensitive information with the received sensitive information to create an updated pre-installation document; and install the at least one deployment unit from the one or more deployment units corresponding to the new version of the installed software product in the second phase of the split installation, based on the updated pre-installation document; and in response to determining that the product installation option value is the standard installation option, performing the standard installation of the product.

6. The computer implemented method of claim 5, wherein the data for authentication is encrypted in the pre-installation document.

7. The computer implemented method of claim 5, wherein the one or more deployment units comprise a build, documents and installation artifacts.

8. The computer implemented method of claim 5, wherein the second phase of the split installation, comprises:
retrieving the pre-installation document;
determining an error in the pre-installation document;
rectifying the error when the error is determined; and
installing the at least one deployment unit from the one or more deployment units corresponding to the new version of the installed software product.

9. A computing system to provide split installation of a new version of an installed software product, comprising:
at least one processor; and
one or more memory devices communicative with the at least one processor, wherein the one or more memory devices store instructions to:
receive a request for an installation of a new version of an installed software product, the installed software product including at least one application that is running when the installation is performed, the request for the installation of the new version of the installed software product including a product installation option value comprising one of a split installation option for performing a split installation of the product in multiple phases or a standard installation option for performing a standard installation of the product, wherein the product installation option value controls whether the split installation of the product or the standard installation of the product is performed;
determine whether the product installation option value is the split installation option;
in response to determining that the product installation option value is the split installation option:
in a first phase of the split installation, perform operations including the split installation of the new version of the installed software product, comprising:
while the at least one application is running, generating and storing a pre-installation document associated with the split installation of the new version of the installed software product, wherein the pre-installation document comprises installation information including one or more deployment units and data for authenticating the computer, wherein the data for authenticating the computer is selected from at least one of an identity information of the computer, a password, a location of installation on the computer, and one or more port numbers, and wherein sensitive information is encrypted in the pre-installation document; and
based on the installation information from the pre-installation document, caching, while the at least one application is running, at least one deployment unit from the one or more deployment units corresponding to the split installation of the new version of the installed software product;
receive an indication of successful completion of the first phase of the split installation; and
in response to receiving the indication of the successful completion of the first phase of the split installation:
provide a resume option to either initiate a second phase of the split installation or cancel the split installation;
receive, in response to providing the resume option, an indication to initiate the second phase of the split installation;
determine that the pre-installation document includes encrypted sensitive information that needs to be replaced;
provide a user interface for requesting sensitive information for authenticating the computer to replace the encrypted sensitive information;
receive, through the user interface, sensitive information to replace the encrypted sensitive information; and
replace, in the pre-installation document, the encrypted sensitive information with the received sensitive information to create an updated pre-installation document; and
install the at least one deployment unit from the one or more deployment units corresponding to the new version of the installed software product in the second phase of the split installation, based on the updated pre-installation document; and
in response to determining that the product installation option value is the standard installation option, performing the standard installation of the product.

10. The computing system of claim 9, wherein the data for authentication is encrypted in the pre-installation document.

11. The computing system of claim 9, wherein the one or more deployment units comprise a build, documents and installation artifacts.

12. The computing system of claim 9, wherein the second phase of the split installation comprises:
retrieve the pre-installation document;
determine an error in the pre-installation document;
rectify the error when the error is determined; and
install the at least one deployment unit from the one or more deployment units corresponding to the new version of the installed software product on the computer system.

* * * * *